United States Patent [19]
Wohnhaas et al.

[11] 3,856,367
[45] Dec. 24, 1974

[54] SPIRAL-GROOVED BEARING AND METHOD OF MANUFACTURE

[75] Inventors: Horst Wohnhaas; Kurt Haas, both of Friedrichshafen; Manfred Granzow, Meckenbeuren, all of Germany

[73] Assignee: Dornier Systems GmbH, Friedrichshafen, Germany

[22] Filed: Feb. 16, 1973

[21] Appl. No.: 333,312

[30] Foreign Application Priority Data
Mar. 1, 1972 Germany.............................. 2209712

[52] U.S. Cl................. 308/9, 308/159, 29/148.4 R
[51] Int. Cl.... F16c 17/16, F16c 17/04, B21d 53/10
[58] Field of Search........ 29/148.4 R; 308/159, 230, 308/9

[56] References Cited
UNITED STATES PATENTS
1,208,526   12/1916   Ellis .................................... 308/159

*Primary Examiner*—Manuel A. Antonakas
*Assistant Examiner*—Frank Susko
*Attorney, Agent, or Firm*—James E. Bryan

[57] ABSTRACT

A hydrodynamically-acting sliding bearing including a shaft having a central conical bore formed in its end and a roller bearing ball affixed in the bore, the bore being dimensioned with respect to the ball such that a gap is formed between the edge of the shaft and the line of contact of the bore with the ball, a bond, such as with solder or adhesive or by an electron beam welding, is formed in the gap to affix the ball to the shaft, a supporting member of a hardenable alloy operatively cooperates with the shaft and ball and has an imprint of a spherical segment formed in an initially plane surface by punching another roller bearing ball into the plane surface prior to hardening, the supporting member is surface hardened by air contact, at least in the area of the imprint of the spherical segment, and the ball on the shaft is so dimensioned with respect to the imprint in the supporting member that a small gap exists between this ball and the imprinted segment. In the punching of the supporting member, the supporting member is placed in a countersink of a die, the die is further countersunk to receive an annular elastic ring which fits about the periphery of the supporting member, adjacent the surface to be punched, to accommodate material displaced during punching and a bore is also formed in the die on the side opposite the surface to be punched to accommodate material displaced by the punching.

24 Claims, 4 Drawing Figures

SPIRAL-GROOVED BEARING AND METHOD OF MANUFACTURE

The present invention relates to a hemispherical, spiral-grooved bearing for high-speed components of devices, in which predominantly axial forces, but to a certain extent also radial forces, are absorbed by the bearing.

For high-speed devices, such as ultra-gas centrifuges, medical instruments, gyroscopic devices for navigation and aircraft position control, etc., which, in part, have very small bearing dimensions in their structural configuration, bearings are required which, in the operation thereof, are characterized by a great quietness or smooth running and a long service life, with as little friction as possible.

Known constructions, of so-called hydrodynamically-acting, sliding bearings, operate according to the principle of a rotary shaft and a stationary supporting member, between which a lubricating film is built up. On the side of the bearing, the rotary shaft is provided with a spherically-shaped end and, the spherical surface is provided with spiral-shaped, like shallow grooves, which, according to or depending upon the direction of rotation, extend from below the equator thereof toward the pole of the sphere, thus urging the lubricant from the outside of the bearing toward the center. The counterpiece of this sphere is a ball cup or socket which must be fitted, or trued, exactly with respect to the hemisphere rotating therein. The accuracy of the sphere and of the ball cup or socket, with regard to each other, is codeterminative so that a sufficiently high pressure of lubricant can be established through the spiral-shaped grooves. The tolerance between ball and ball cup enters directly into the bearing strength or load capacity of the bearing, as an essential factor. The manufacture of accurate ball cups or sockets and shafts with a ball or sphere integrated on one end involves great expenditures and considerable difficulties in bearing constructions having small bearing diameters. Thus, the manufacture of an accurate sphere half at the end face of a shaft is possible only as the result of great mechanical processing expenditures. The corresponding sphere half is ground-in together with the respectively coordinated ball cup. Both parts must be characterized as belonging together, or being corresponding elements, hence an exhange of the individual components after this processing phase is no longer possible. A further disadvantage resides in the mounting or assembly and maintenance of such bearings, inasmuch as only complete bearings can be exchanged; in other words, ball cups together with the coordinated sphere or ball and shaft. Also, during assembly, the correlation of the jointly processed bearing components must be strictly observed and adhered to.

The present invention aims at finding and proposing a spiral-grooved bearing with a high degree of accuracy and efficiency and simple manufacture, assembly, and maintenance, which is also suitable, particularly in the case of small ball diameters, for series production.

This object is obtained, in accordance with the present invention, by virtue of the fact that the supporting member provided is a body consisting of a hardenable alloy and having a plane surface; the imprint of a spherical cup is impressed or embossed into its surface with a roller or antifriction bearing sphere or ball; and a roller bearing sphere, having the same order of magnitude but smaller dimensions adjacent the bearing gap, is disposed at the shaft end.

Prior to the sphere being pressed in, the supporting member is so treated, or processed, on the outside diameter thereof that, in the region or area of the hemispherical imprint, a contraction, waisting, or annular groove will be produced, whereby a precise impression of the roller bearing sphere having exact dimensions can be produced, while an elastic, reverse deformation of the spherical segment or cap material is essentially avoided. The roller bearing sphere, used for purposes of stamping or imprinting, is considered as scrap after the stamping or imprinting operation and is not employed further.

During the imprinting operation with a roller bearing sphere, reception of the supporting body takes place in the area of the eventual sphere imprint and at the outside diameter with the aid of an elastic material, for example "Vulkolan", which is pressed into a centering plate as a bushing. In addition to being received by the aforementioned elastic bushing, during the imprinting operation, the supporting body is received by a metallic receiving body which is positioned opposite the spherical impression, has a cylindrical countersink of limited depth and a bore diameter corresponding to the outside diameter of the supporting body, and is provided with a central bore. The elastic bushing and the base plate having the cylindrical countersink and central bore are rigidly connected with each other and constitute the receiving device for the supporting body during the imprinting operation. On the basis of tests it has been found that, when the sphere or ball is pressed in, the material of the supporting body will be deformed uniformly and, as a result, will produce a hemispherical imprint of perfect accuracy corresponding to the roller bearing ball being employed, because of the receiving device as described above.

After the stamping operation, the segment or cup is hardened, and, in this connection, hardening in the air has been found to be advantageous for the purpose of obtaining a wear-and-tear resistant oxide layer.

A further significant factor, in simplifying the manufacture of a spiral-grooved bearing, consists in the attachment of a roller bearing ball on the shaft. This shaft is provided, on the end face, with a conical countersink in which the ball centers itself and in which it is connected, by means of an appropriate process, for example, electron beam welding, spot welding, or gluing, depending upon the intended purpose of the bearing, without the hardness, accuracy of shape, and surface quality of the hemisphere at the outside of the bearing ball being impaired thereby.

The construction and provision of the spiral-grooved bearing, described above, permits a simple and extremely inexpensive manufacture of precise bearing components, such as, a segment or cup, with an exactly hemispherical imprint, and a shaft with a roller bearing ball, which has spiral-shaped grooves on the surface thereof.

During the assembly of the bearings, it has been found to be advantageous that the bearing components, which are made of the same grade as roller bearing balls are interchangeable in any manner desired. Also, as a matter of principle, an exchange of only one bearing part, during maintenance work, etc., is readily possible. The manufacture of bearings, which are relatively small in their dimensions, has not been found to be problematic in any way, neither from the point of view of the precision of the individual bearing components, nor from the point of view of manufacturing costs.

One embodiment of the spiral-grooved bearing of the present invention, as well as of the imprinting device will now be further described hereinafter on the basis of and with reference to the accompanying drawing, wherein.

Figure 1:
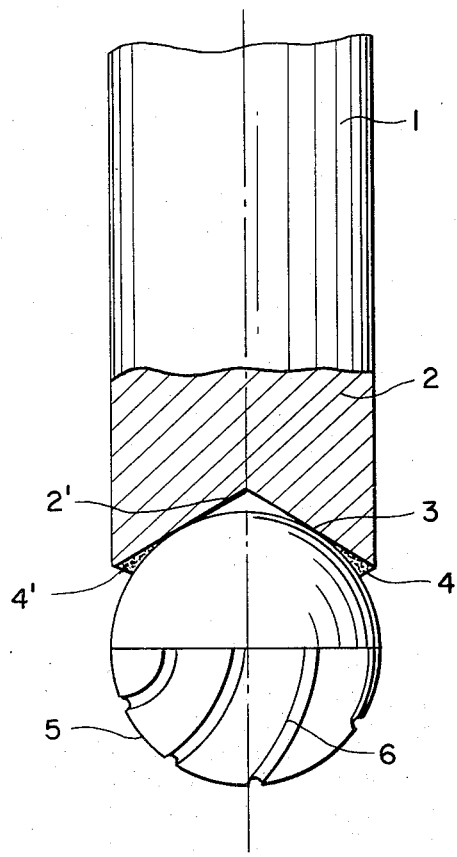
FIG. 1 illustrates the shaft end with the roller bearing ball connected thereto.

Shown in FIG. 1 is the shaft 1 with the shaft end 2 and a conical centering bore 2' in the shaft end 2. The conical centering bore 2', in the shaft end 2, centrally receives a roller bearing ball 5, and the shaft edge 4 projects beyond the line of contact 3 which will be produced between the spherical surface and the bore wall, thus providing an annular, wedge-shaped gap 4'. This gap 4' may serve for receiving an adhesive or solder which rigidly connects the roller bearing ball 5 with the shaft 1. Furthermore, the projecting shaft edge 4 may be welded to the roller bearing ball 5 by fusing with the aid of an electron beam welding device. Because of these types of bonding or connection, the roller bearing ball 5 will not be impaired, in the area of the subsequently applied spiral grooves 6, neither with respect to the hardness and accuracy of shape thereof nor with respect to its surface quality. The application of the spiral grooves 6 on the ball 5 is not the object of the present invention and will therefore not be further described herein.

Figure 2:
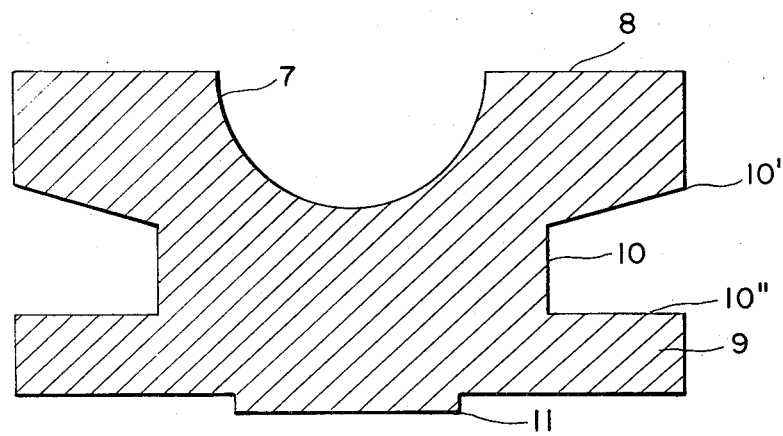
FIG. 2 illustrates the supporting member with the impressed or imprinted segment or cup.

FIG. 2 shows a supporting member 9 with an embossed or impressed segment or cup 7. The supporting member 9 advantageously has an axially symmetrical shape and is provided, in the area of the segment 7, with an annular contraction, waisting or annular groove 10, which, on the side facing the segment 7, has an inclined grooved wall 10', and on the side opposite the segment 7 a grooved wall 10" positioned at a right angle with respect to the axis of rotation. This contraction 10 has the effect that, during the imprinting or embossing operation for the segment, by means of a roller bearing ball, the material of the supporting member can flow substantially unimpeded, which will result in a precise imprint of the roller bearing ball employed for the embossing, not only with respect to the accuracy of the shape but also with respect to the surface quality. The buckled or projecting portion 11 found at the opposite side of the segment 7 is also formed, or caused, by the flow of material produced when the ball is pressed in. The supporting body 9 is surface-hardened after the embossing or impressing operation, and a hardening with the influence of air is used therefor, which causes a hard oxide layer to be produced at the surface of the supporting body. This hard oxide layer has been found to be highly wear-and-tear resistant, and this is extremely advantageous in the starting condition of the bearing, when a completely supportive lubricating film has not as yet been formed.

Figure 3:
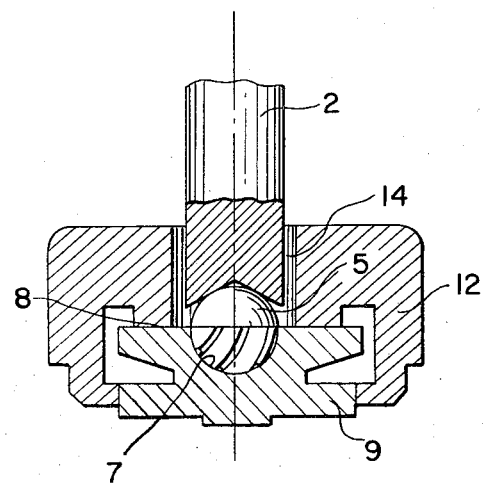
FIG. 3 is a side view of the complete bearing.

FIG. 3 illustrates a side view of the bearing in its entirety. Represented in this figure are the shaft end 2 with the roller bearing ball 5 connected thereonto, the supporting body 9, and the carrying and holding device 12. The carrying and holding device 12 is so provided and arranged that it receives the supporting body 9 on the one hand and encloses the roller bearing ball 5 with a portion of the shaft end 2. The bore 14, of the carrying and holding device 12 is provided with a galvanic coating representing an abrasion-proof surface, which allows the shaft 1, together with the roller bearing ball 5 connected thereto, to be driven in and out without causing abrasion of the bore wall 14 of the carrying and holding device. It has been discovered that such abrasion, during the operation of the bearing, leads to an increased wear and tear of the active bearing components and profoundly affects the service life of the bearing. The carrying and holding device 12 centrally receives the supporting body 9, in the area of the segment 7 and on the surface 8, and on the outside diameter of the supporting body 9 below the section containing segment 7. Furthermore, the supporting body 9 is screwed, with the carrying and holding device 12 receiving it, into a bearing housing (not further shown herein), and thus fixed or secured in the axial direction.

Figure 4:
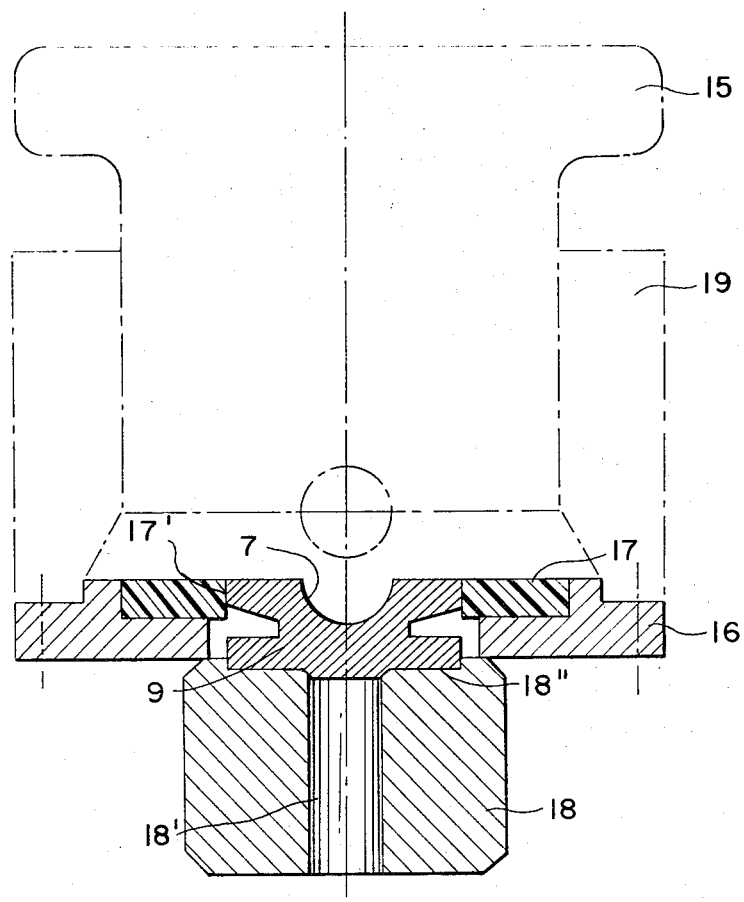
FIG. 4 illustrates a receiving device for the impressing or embossing operation.

FIG. 4 represents a receiving device which receives or houses the supporting body 9 during the impressing or embossing operation. The following structural elements are shown in this figure: a stamp or punch 15, a stamp or punch guide 19, a centering plate 16, a receiving body 18, and a supporting body 9. The centering plate 16 has a central pressed-in elastic ring 17, which may consist, for example of the plastic "Vulkolan", available on the market, and whose inside diameter 17' receives the supporting body 9, at the outside diameter, within the area of the segment 7. Moreover, the supporting body 9 is received or housed by the receiving body 18 in a countersink 18" of smaller depth. The countersink 18" of the receiving body is provided with a central bore 18'.

For imprinting the segment 17 in the supporting body 9, a stamp or punch 15 (here shown in dash-dotted lines) is used with a stamp or punch guide 19, and this punch has a central hemispherical recess, which serves for receiving a roller bearing ball for the embossing operation, on the imprinting or embossing side. When the roller bearing ball is pressed into the supporting body material, which has not yet fully hardened and which may consist, for example, of a $CuBe_2$ alloy, a material flow is produced which results in an increase of the diameter of the supporting body 9. This increase in diameter is elastically absorbed by the ring 17 of the centering plate 16, so that a lasting deformation of the supporting body 9 will arise as a consequence. During the imprinting or embossing operation, the bore 18', in the receiving body 18, likewise allows for an expansion of the material of the supporting body in the axial direction. The arrangement described hereinabove and the contraction or waisting at the outside diameter of the supporting body 9 have the advantage that the cup-shaped imprint or embossing in the supporting body 9 is imparted by a roller bearing ball of a highly precise shape and surface accuracy.

It will be obvious to those skilled in the art that many modifications may be made within the scope of the present invention without departing from the spirit thereof, and the invention includes all such modifications.

What is claimed is:

1. A hydrodynamically-acting sliding bearing; comprising, a shaft having a roller bearing ball affixed to the end thereof, and a supporting member of a hardenable alloy adapted to operatively cooperate with said end of said shaft and having an imprint of a spherical segment formed in an initially plane surface by punching a roller bearing ball into said plane surface prior to the hardening of said hardenable alloy, said roller bearing ball affixed to the end of said shaft having dimensions of the same order of magnitude but slightly smaller than the dimensions of said imprint of said spherical segment to form a gap between said roller bearing ball and said imprint of said spherical segment.

2. A bearing in accordance with claim 1 wherein the shaft has formed therein a conical centering bore having dimensions such that said bore will receive the roller bearing ball and forms a gap between the shaft edge, projecting beyond the line of contact between said bore and said roller bearing ball, and said roller bearing ball.

3. A bearing in accordance with claim 2 wherein the gap formed between the projecting shaft edge and the roller bearing ball contains a bonding material for affixing said roller bearing ball to said shaft end.

4. A bearing in accordance with claim 3 wherein the bonding material is solder.

5. A bearing in accordance with claim 3 wherein the bonding material is an adhesive.

6. A bearing in accordance with claim 2 wherein the roller bearing ball is electron beam welded to the shaft end in the gap between the shaft edge and said roller bearing ball.

7. A bearing in accordance with claim 1 wherein the roller bearing ball has spiral grooves formed in the surface thereof.

8. A bearing in accordance with claim 1 wherein the supporting member has an axially symmetrical shape.

9. A bearing in accordance with claim 8 wherein the supporting member has an annular waisting formed about its periphery.

10. A bearing in accordance with claim 9 wherein the upper wall of the annular waisting, nearest the imprint of the spherical segment, extends diagonally toward the central axis of the supporting members and the wall of said annular waisting furtherest from said imprint of said spherical segment, extends perpendicularly toward said central axis of said supporting member.

11. A bearing in accordance with claim 1 wherein the supporting member has a hard oxide layer formed thereon, at least in the area of the imprint of the spherical segment.

12. A bearing in accordance with claim 11 wherein the hard oxide layer is formed by air contact therewith.

13. A bearing in accordance with claim 1 wherein a holding means is affixed to the supporting member and has a central bore therein to receive the shaft end and an abrasion-proof surface formed on the wall of said central bore.

14. A method of forming a supporting member adapted to operatively cooperate with the end of a shaft having a roller bearing ball affixed thereto, in a hydrodynamically-acting sliding bearing; comprising, forming said supporting member of a hardenable alloy and having a plane surface, punching a roller bearing ball into said plane surface to form a spherical imprint of said roller bearing ball and thereafter hardening said supporting member, at least that portion of said supporting member having said imprint of said roller bearing ball.

15. A method in accordance with claim 14 wherein the supporting member has an axially symmetrical shape.

16. A method in accordance with claim 15 wherein the supporting member has an annular waisting formed about its periphery.

17. A method in accordance with claim 16 wherein the upper wall of the annular waisting, nearest the spherical imprint, extending diagonally toward the central axis of the supporting member and the wall of said annular waisting furtherest from said spherical imprint, extends perpendicularly toward said central axis of said supporting member.

18. A method in accordance with claim 14 wherein a hard oxide layer is formed on the surface of the supporting member, at least in the area of the spherical imprint.

19. A method in accordance with claim 18 wherein the hard oxide layer is formed by air contact therewith.

20. A method in accordance with claim 14 wherein the supporting member is positioned in a die during the punching thereof.

21. A method in accordance with claim 20 wherein the die is countersunk to receive the supporting member.

22. A method in accordance with claim 21 wherein the die is additionally countersunk and an annular elastic ring is positioned in said countersink and about the periphery of the supporting member, adjacent the plane surface, to accommodate the material displaced during the punching operation.

23. A method in accordance with claim 20 wherein the die has a central bore therein, on the side of the supporting member opposite the side being punched, adapted to accommodate the material displaced during the punching operation.

24. A method in accordance with claim 23 wherein the die is additionally countersunk and an annular elastic ring is positioned in said countersink and about the periphery of the supporting member, adjacent the plane surface, to accommodate the material displaced during the punching operation.

* * * * *